April 12, 1927.
F. E. FREEL
1,624,865
TANK CAR CLEANING DEVICE
Filed May 2, 1922
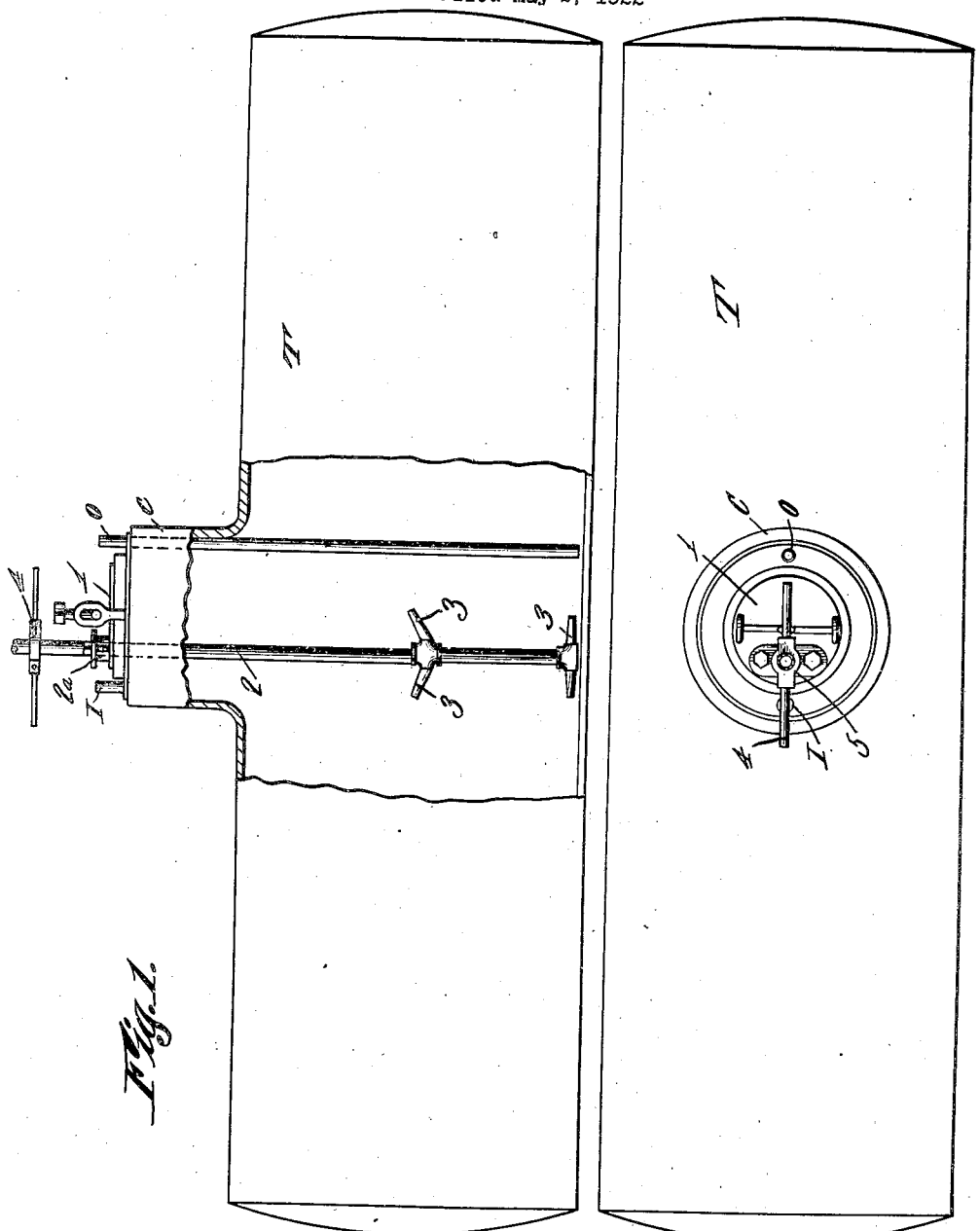

Patented Apr. 12, 1927.

1,624,865

UNITED STATES PATENT OFFICE.

FRANCIS E. FREEL, OF NILES, OHIO.

TANK-CAR-CLEANING DEVICE.

Application filed May 2, 1922. Serial No. 558,015.

This invention relates to a cleaning device for tank cars and other tanks.

The object of the invention is to provide a device for cleaning tank cars or other tanks which have no opening except at the top so as to avoid the necessity of removing the tank and turning it upside down when it is desired to wash out the tank.

Another object is to so construct a device of this character that the cleansing fluid may reach all parts of the tank.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a tank with parts broken out and in section, the device constituting this invention being shown applied and in side elevation, and Fig. 2 is a top plan view thereof.

In the embodiment illustrated a tank T is shown having a filling chamber C located on the top thereof and closed air tight in the usual manner, an air inlet pipe I being shown entering said chamber while a discharge pipe or outlet O extends through the chamber to a point near the bottom of the tank. All of these parts are those ordinarily found in tank cars and constitute no part of the invention.

The attachment constituting this invention comprises a removable closure 1 for the chamber C through which extends a water supply pipe 2 having a stuffing box 2ª arranged around it to provide for its rotation and to prevent air entering around it. This pipe 2 extends to a point near the bottom of tank T and is equipped with a plurality of series of spaced discharge nozzles 3 which extend laterally from the pipe and on the rotation of said pipe discharges the cleansing fluid in all directions so as to reach remote portions of the tank and thereby thoroughly agitate the contents thereof and efficiently clean the tank. The pipe 2 outside the tank is provided with a handle 4 for rotating it.

In the use of this cleansing device the parts being in the position shown in Fig. 1 water under pressure of fifty pounds more or less is admitted through pipe 2 and sufficient air pressure is inserted through the inlet I to force water in the tank up through the discharge pipe as fast as it is admitted through pipe 2. The water under pressure passing out through the nozzles 3 will be sprayed in all directions and the turning of the pipe 2 will bring it into contact with all walls of the tank keeping the contents thoroughly agitated so that all sediment in the tank will be carried out through the discharge pipe O and discharged at any suitable point.

The pipe 2 is shown held engaged with the closure 1 and is suitably secured in any desired manner to the pipe and to said closure.

From the above description it will be seen that when it is desired to clean a tank T all that is necessary is to insert the pipe 2 in the manner above set forth, supply water under pressure thereto, and air under pressure to pipe I and the tank will thoroughly be cleaned without necessitating the removal thereof from its support and the turning of it upside down as is now necessary with tanks of this character.

I claim:—

In a device of the character described, a removable closure adapted to be fitted into the opening of a tank, a water supply pipe extending through the removable closure, means for providing a fluid-tight connection between the pipe and closure, horizontal discharge nozzles at the lower end of the pipe, said pipe adapted to extend to a point adjacent to the bottom of the tank, and upwardly inclined nozzles communicating with the pipe and arranged at a point in spaced relation with the lower end of the pipe, and means for rotating the pipe to direct jets of water to every point of the interior of the tank.

In testimony that I claim the foregoing as my own, I have hereto affixed my signature.

FRANCIS E. FREEL.